United States Patent [19]

Bouldin et al.

[11] Patent Number: 4,837,134
[45] Date of Patent: * Jun. 6, 1989

[54] OPTICAL MEMORY CARD WITH VERSATILE STORAGE MEDIUM

[75] Inventors: Eric W. Bouldin, Atherton; Jerome Drexler, Los Altos Hills, both of Calif.

[73] Assignee: Drexler Technology Corporation, Mountain View, Calif.

[*] Notice: The portion of the term of this patent subsequent to Jun. 28, 2005 has been disclaimed.

[21] Appl. No.: 39,506

[22] Filed: Apr. 16, 1987

Related U.S. Application Data

[63] Continuation-in-part of Ser. No. 896,988, Aug. 15, 1986, abandoned.

[51] Int. Cl.⁴ .............. G03C 1/02; G03C 5/32; G01D 15/24; G01D 15/26
[52] U.S. Cl. .............. 430/445; 346/76 L; 346/135.1; 430/270; 430/290; 430/346; 430/495; 430/525; 430/616; 430/945; 430/964
[58] Field of Search ............. 430/525, 616, 945, 270, 430/290, 964, 495, 346, 445; 346/76 L, 135.1

[56] References Cited

U.S. PATENT DOCUMENTS

| | | | |
|---|---|---|---|
| 4,239,338 | 12/1980 | Borrelli et al. | 350/155 |
| 4,269,917 | 5/1981 | Drexler et al. | 430/616 |
| 4,278,756 | 7/1981 | Bouldin et al. | 430/414 |
| 4,278,758 | 7/1981 | Drexler et al. | 430/350 |
| 4,387,381 | 6/1983 | Bell | 346/135.1 |
| 4,542,288 | 9/1985 | Drexler | 235/487 |
| 4,603,099 | 5/1986 | Drexler | 430/140 |
| 4,636,804 | 1/1987 | Kuder | 346/1.1 |
| 4,673,626 | 5/1987 | Takeda et al. | 430/14 |

FOREIGN PATENT DOCUMENTS

0158906 10/1985 European Pat. Off. .

Primary Examiner—Mukund J. Shah
Attorney, Agent, or Firm—Thomas Schneck

[57] ABSTRACT

A data card for optical information featuring a gelatin layer having a thin black crust at the top of the layer. The crust is formed by developed black irregular oblong silver particles within the top 0.5 micron of the gelatin colloid matrix. The remainder of the colloid matrix is substantially clear gelatin and a reflective metallic layer is disposed below the gelatin. The strip is laminated into a wallet-size card and may be pre-patterned during formation of the crust with control indicia or pre-recorded data. User data may be recorded by modifying the black silver particles in the crust with a laser to expose the reflective underlayer. A laser or other light source is used to read data on the medium with optical contrast between the black surface metallic layer underlying the gelatin layer which can be observed in the recorded spots.

17 Claims, 3 Drawing Sheets

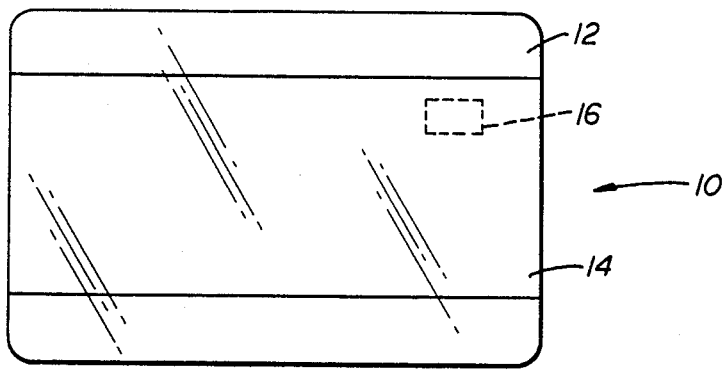
FIG._1.
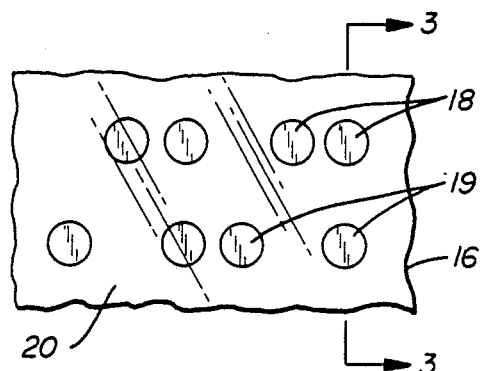
FIG._2.
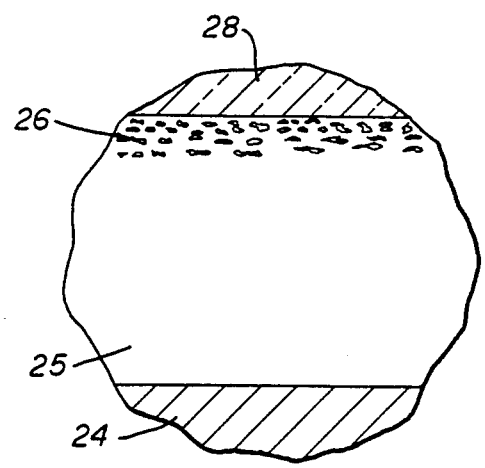
FIG._3A.
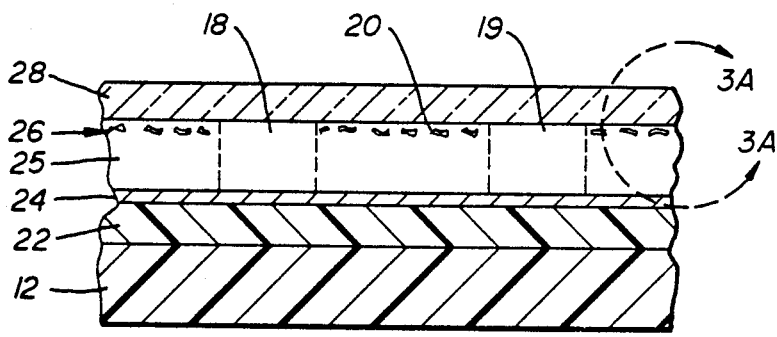
FIG._3.
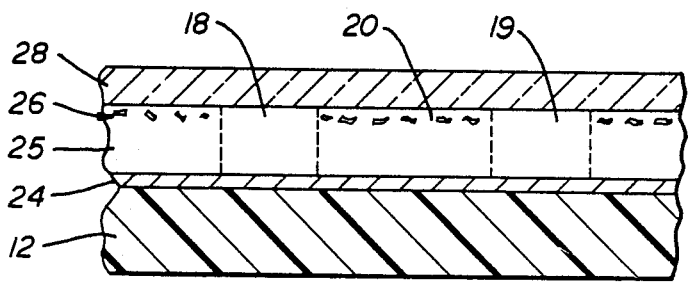
FIG._3B.

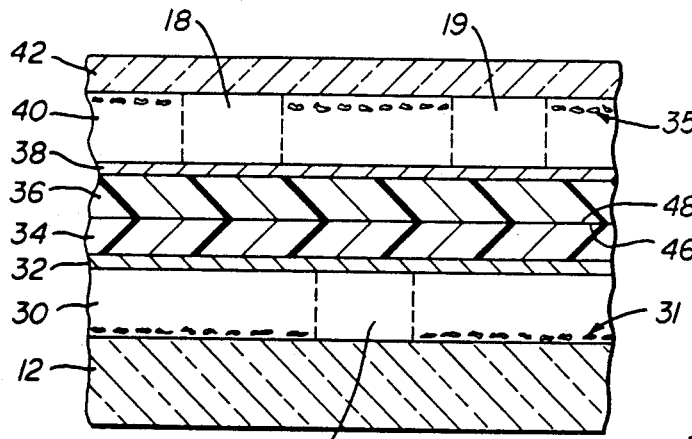
FIG._4.
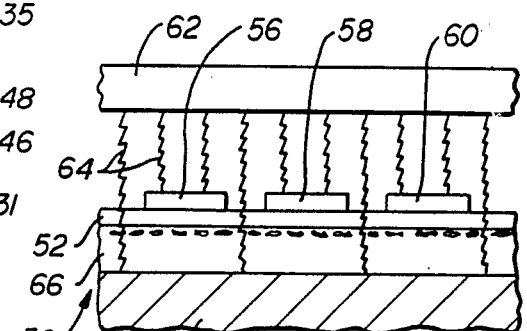
FIG._6.
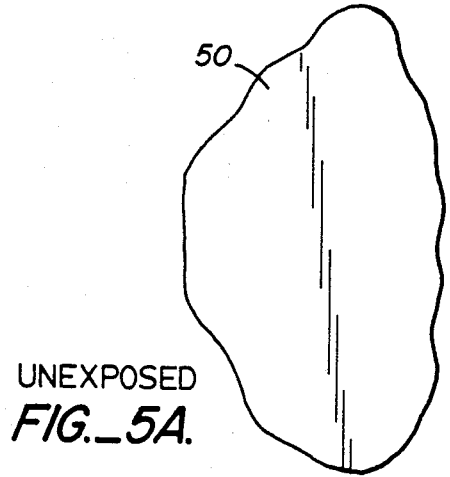
UNEXPOSED
FIG._5A.
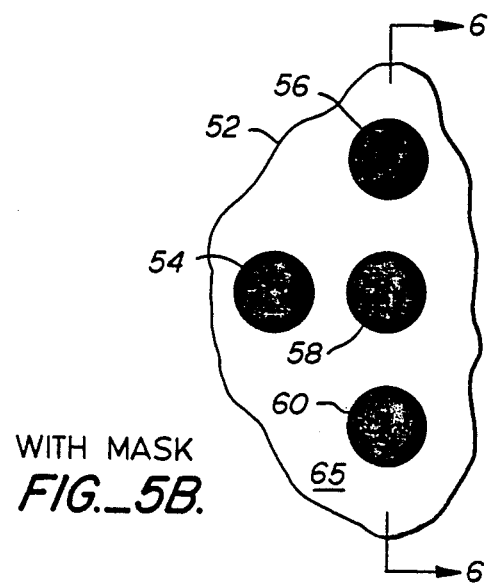
WITH MASK
FIG._5B.
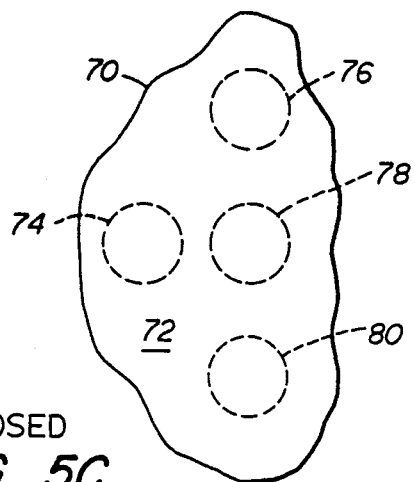
EXPOSED
FIG._5C.
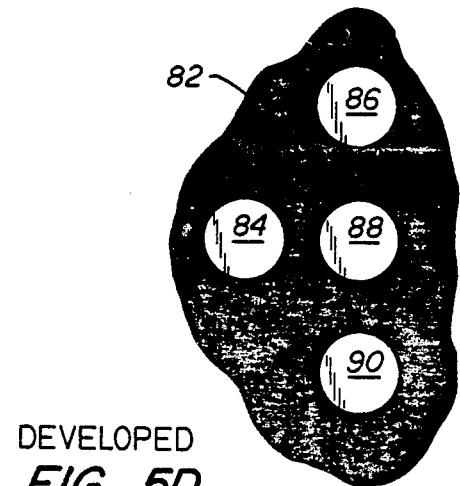
DEVELOPED
FIG._5D.

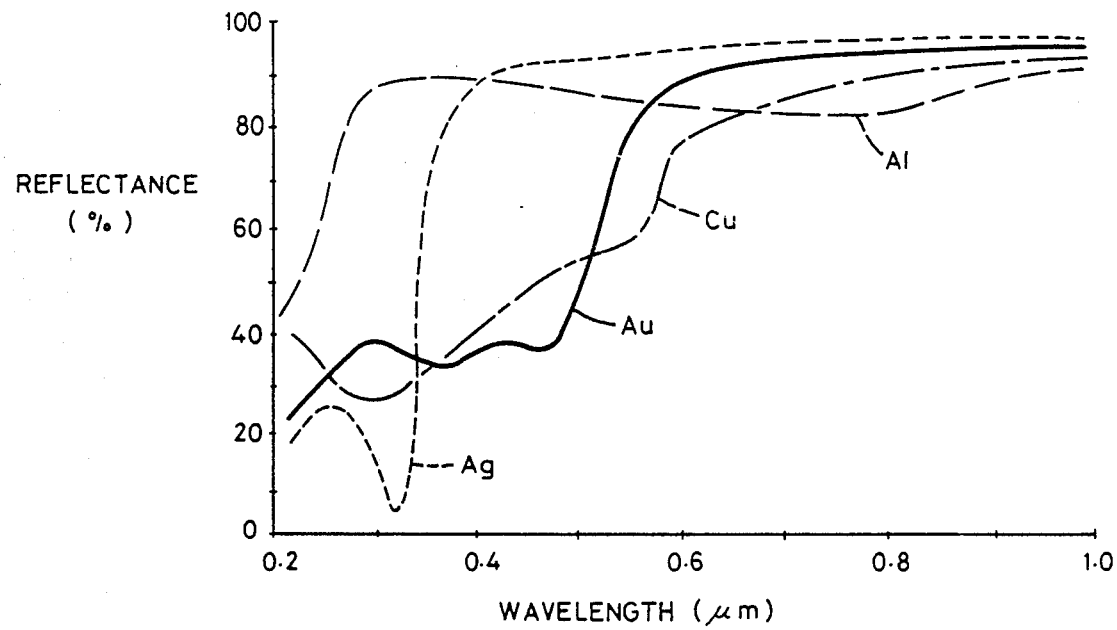
FIG._7.
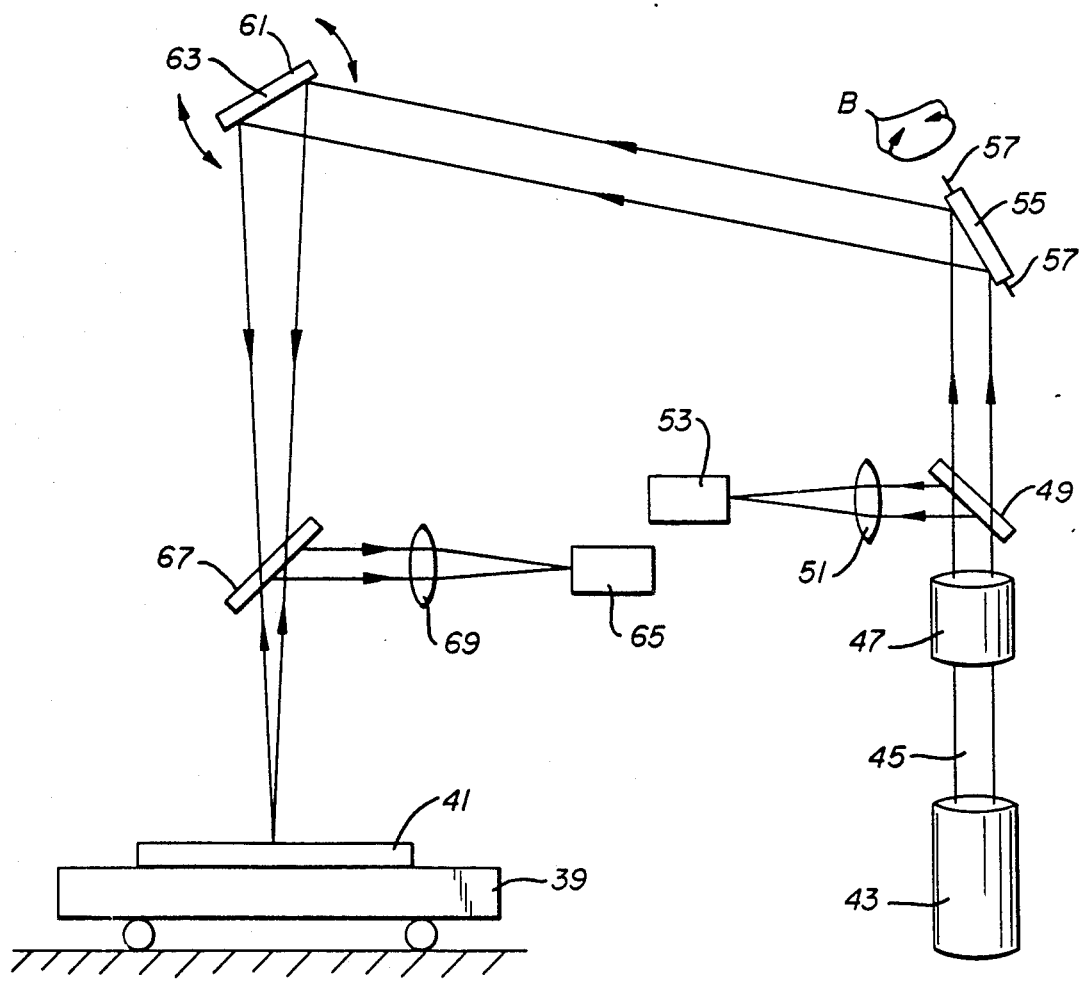
FIG._8.

OPTICAL MEMORY CARD WITH VERSATILE STORAGE MEDIUM

CROSS-REFERENCE TO RELATED APPLICATIONS

This application is a continuation-in-part of application Ser. No. 896,988, filed Aug. 15, 1986, abandoned.

DESCRIPTION

1. Technical Field

The invention relates to optical data storage and in particular to a card having a high contrast medium adapted for both prerecorded and user recorded data.

2. Background Art

In U.S. Pat. No. 4,239,338, Borrelli et al. teach an optical information storage medium comprising a glass substrate, a 1000 Angstrom thick silver layer applied to the substrate, an oxide layer deposited over the silver layer and a multilayer additively colored AgC1/PbO film applied over the oxide layer. The film is optically bleachable using visible light to produce a dichroic, birefringent image. The image is read in infrared light, since the film is transparent at infrared wavelengths down to the silver layers. The silver layer permits reading and writing in the reflective mode. The film should have a thickness not exceeding about two microns to permit high spot resolution.

In U.S. Pat. No. 4,278,756, Bouldin et al. teach a reflective laser recording and data storage medium formed from a photosensitive silver-halide emulsion. The emulsion is exposed and developed using a negative silver diffusion transfer process to make the film surface shiny compared to data spots which are clear or dark. The shiny surface may be above or below the main body of the emulsion depending on whether the reading light is to be introduced from above or from below through a clear substrate.

In U.S. Pat. No. 4,542,288, Drexler teaches use of a data card having the media of the kind described in U.S. Pat. No. 4,278,756. Certain information, such as servo tracks and data base information, can be prerecorded photolithographically.

In reflective optical data storage media, high optical contrast between data spots and the media background and sharply defined data spots are necessary for resolving data, particularly where data spots are small, i.e. ten microns or less in size. For inexpensive optical memory cards it is also desirable that the optical storage and recording media provide several capabilities in addition to high contrast and high resolution. The media should record with a laser beam, it should be capable of pre-recording servo track guides, timing marks or other formatting indicia and data during card manufacturing and it should be capable of laser recording formatting patterns on a finished optical memory card. An optical memory card is valuable with data bits as large as three to ten microns while optical disks require data bits one micron or smaller to be valuable. Thus technical approaches can be used with cards that cannot be used with disks.

An object of this invention was to achieve adequate recording sensitivity for laser written data on reflective optical storage media applicable to optical memory cards, while providing for optical photolithographic pre-recording of track formats and other data prior to completion of the finished card and also providing for laser recording of track formats and other data on finished optical memory cards.

DISCLOSURE OF THE INVENTION

The above object has been achieved in an optical memory card having a sensitive laser recording medium which is also suitable for optional pre-recording of tracking or control information as well as for user data. The medium is a laser recording material layer having a thin black upper crust of irregular shaped metal particles forming a dark field with a clear underlayer and with a thin, reflective metallic layer beneath the laser sensitive medium, all supported on a card base. Both the crust and clear underlayer reside in the same layer and thus have the same contour without any spaces which might lead to refraction. The thin dark crust is highly absorptive to light so that modification, displacement and/or agglomeration of the metal particles in the crust by laser light reveals the shiny reflective metallic underlayer. A principal effect of laser light on the irregular metal particles of the dark crust is to modify their shape to that of smooth spheroids with reduced covering power. The medium is suitable for track and data prerecording because it can be patterned with information on the surface prior to formation of the dark field.

The optical storage medium can be made in the following way. A transparent substrate layer is covered with three layers to form the optical storage material. Over the substrate layer, a very thin reflective metallic layer is vacuum or vapor deposited, with a total thickness typically of 100 to 1000 Angstroms. Over this reflective layer is a photographic-type gelatin layer which has within it a very thin crust of irregular shaped but nonfilamentary low reflectivity black silver particles. This very thin layer shall be referred to as the black silver crust. The black silver crust may be at the upper surface farthest from the reflective layer or it could be nearer to the reflective layer. This black silver crust may be patterned with clear areas prior to card manufacture since the black silver is created by conversion of a photosensitive emulsion by a photographic exposure and development process.

The developed image pattern transmits light with respect to the surrounding dark, light-absorptive field. Optical contrast is enhanced by means of the metallic layer just above the substrate which reflects light back in the direction from whence it came. The metallic layer may be either gold, silver, aluminum, platinum, rhodium or copper.

Where two similar optical storage film substrates are processed as described above, they may be mounted back to back atop a transparent planar plastic base. This arrangement yields a double sided optical recording medium in which both sides may be read or written upon simultaneously.

The very thin black silver reflectively read medium of optical memory cards of the present invention is a more sensitive laser recording medium compared to some other recording media. Additionally, optical contrast is enhanced by means of the underlying reflective layer. The combination of the thin black silver layer, the gelatin layer and the highly reflective metal layer form an optical data storage medium for optical memory cards which has a good laser recording sensitivity, a capability of pre-recording track formats and other data and a capability of laser recording track formats and other data on finished cards.

BRIEF DESCRIPTION OF DRAWINGS

FIG. 1 is a top plan of a data card of the present invention.

FIG. 2 is an enlarged portion of the data card of FIG. 1 revealing data spots.

FIG. 3 is a side sectional view of the data card taken along the line 3—3 in FIG. 2.

FIG. 3a is a detail magnified about line 3A—3A in FIG. 3.

FIG. 3b is a side sectional view similar to FIG. 3 of an alternate embodiment of the data card of the present invention.

FIG. 4 is a side sectional view similar to FIG. 3 showing a third data card embodiment of the present invention.

FIGS. 5A–5D are top plan views of portions of the data card of FIG. 1 illustrating a method of pre-recording data spots.

FIG. 6 is a side sectional view taken along the line 6—6 in FIG. 5B.

FIG. 7 is a graph showing reflectivity of metallic layers versus wavelength.

FIG. 8 is a plan view of optical apparatus for reading and writing on a data card with a laser.

BEST MODE FOR CARRYING OUT THE INVENTION

With reference to FIG. 1, an optical memory card 10 comprises a self-supporting, wallet-size, planar plastic base 12 with a strip 14 of recording material disposed thereon. Strip 14 may be either single sided, as described below with reference to FIGS. 3 and 3b, or double sided, as described below with reference to FIG. 4. Base 12 may be either transparent or opaque, but must be transparent where strip 14 is double sided. Typically, card base 12 is composed of polycarbonate material, although other suitable materials may also be used. A transparent, planar, protective layer of scratch resistant material may be disposed over strip 14. A preferred size for card 10 is approximately 54 mm by 85 mm, since this size is conventional for credit cards and the like, and easily fits into a wallet. Strip 14 is typically 16 mm to 35 mm wide and extends the length of the card. These dimensions are not critical however.

With reference to FIG. 2, a magnified view of data stored on the strip 14 may be seen. The border 16, corresponds to dashed line 16 in FIG. 1. Data spots 18 are seen to be circular and aligned in paths. A second group of data spots 19 is seen to be aligned in a second path. Spots 18 and 19, as well as an absence of spots 20, represent data bits. For example, spots 18 and 19 may represent 1's and the absence of spots 20 may represent 0's, or vice versa. Data spots 18 and 19 are typically reflective, with a reflectivity at near infrared wavelengths (0.8 to 1.0 microns) generally in the range of 30% to 50%, while the media background is substantially less reflective, with a reflectivity at near infrared wavelengths (0.8 to 1.0 microns) generally less than 20% and preferably less than 15%. Optical reflective contrast between the reflective data spots and the media background is therefore generally greater than 2 to 1 and preferably at least 3 to 1 at reading beam wavelengths. A minimum contrast between the data spots and the background field of 1.2 to 1 is sufficient for reading. The reflectivity of the data spots is not as high as the 80% to 90% expected from the reflective metals used since there are usually some silver particles remaining in the data spot area which absorb some of the incident and reflected light. The laser recorded spots may be oblong or circular, while the prerecorded data spots can be oblong, circular or rectangular. All of the data spots have similar dimensions which are generally less than about 25 microns in size and preferably less than 10 microns in size. The spacing between paths is not critical, and may even be adjoining, provided that the optical reading system is able to easily distinguish between paths.

With reference to FIGS. 3 and 3a, the optical recording media comprises a film substrate layer 22, a highly reflective metallic layer 24 deposited on substrate layer 22 and a selected, thin black silver planar crust 26, generally less than one-half micron thick, within gelatin layer 25. The latter layer is generally one to six microns thick, disposed on metallic layer 24, which is generally 100 Angstroms to 1000 Angstroms thick. During the optical medium manufacturing process the surface of a photosensitive emulsion raw material, such as AgCl-gelatin emulsion, distal to the substrate, is developed to dark or black by exposure to actinic radiation and then to photographic development. Black and clear images can be created if desired by using a photomask. The exposing image is a pattern, either control indicia such as tracks or data or both, to be prerecorded. The depth of the dark layer is typically 0.3 to 0.5 microns. The undeveloped remainder of the emulsion layer which is essentially gelatin remains clear. Film substrate layer 22 is disposed over base 12 in intimate contact therewith in planar relation. Base 12 may be transparent or opaque. A transparent, planar protective layer 28 may be disposed over the laser recording layer 26.

Film substrate layer 22 is typically about 100 to 150 microns thick, and may be composed of polyesters, cellulose acetate, Mylar, or other materials commonly used as film bases. Metallic layer 24 is typically composed of either gold, copper, silver, platinum, rhodium or aluminum or alloys thereof. Gold is preferred because it has a very high reflectivity at the reading wavelength, at least 90 percent in the near infrared, i.e. a wavelength longer than 0.8 microns, thereby giving high data contrast. Also, gold does not react with the photographic chemicals and is environmentally stable for many years. Gold is also desirable because it may be used with photographic emulsion layers 25 and 26 with actinic wavelengths in the blue to green wavelength range (0.4 to 0.6 microns) with reduced halation effect since gold's reflectivity is about 37% in this actinic wavelength range and gelatin layer 25 is generally less than 3 microns thick. Silver and aluminum are also preferred materials but care must be taken that the aluminum does not contaminate the photographic developer solutions. Copper may also be considered for this application but is not as chemically stable as the other three materials. Metallic layer 24 is deposited on film substrate 22 by well-known vapor or vacuum deposition techniques, for example in coating silicon wafers or magnetic metallic memory disks. The layer is on the order of 100 to 1,000 Angstroms thick.

Gelatin layer 25 originally was a silver halide in a gelatin matrix, i.e. a photographic emulsion layer. The gelatin colloid matrix should be made from material which is substantially transparent to a read beam wavelength in the near infrared, and may be further selected to be substantially more absorptive at an actinic wavelength length thereby enhancing the antihalation properties of the recording medium during the preformatting process. Gelatin layer 25 is typically under 3 microns thick, but could be as thick as 10 microns. The gelatin layer 25 containing crust 26 is shown having been exposed to actinic radiation through an imagewise exposure pattern and then developed to be substantially dark only at its surface. Irregular rings in planar crust 26 represent black irregular oblong silver particles embedded in the gelatin colloid matrix. The conversion of the emulsion film into a laser recording material takes place before the film is incorporated into the card, as described in U.S. Pat. Nos. 4,314,260; 4,298,684; 4,278,758; 4,278,756; and 4,269,917, all assigned to the assignee of the present invention.

Clear areas 18 represent data spots stored on the media, as for example by photographic prerecording. Gelatin layer 25 is exposed through an imagewise exposure pattern to actinic radiation, then developed to be substantially dark at its surface. Areas 18 not exposed to actinic radiation are predominantly clear after development and fixing, revealing an underlying reflectivity in the metallic layer 24 when illuminated by light of a read beam wavelength, typically in the near infrared. Servo track lines may be photographically prerecorded as just described. Clear areas 18 may also represent data spots which have been laser recorded by modification, displacement, and/or agglomeration of metal particles in the crust 26 to be predominantly clear, revealing an underlying reflectivity in the metallic layer 24 when illuminated by light of a read beam wavelength. The laser recording beam principally heats the thin dark crust 26 and alters the irregular shape of the silver grains so that they become smooth spheroids. In doing so, the covering power of the silver grains is reduced so that more light can pass between the particles in the spot of modified crust into the underlayer. Heating may also cause some displacement of silver particles away from the spot area, as well as some agglomeration of separate silver particles. Clear areas 18 are preferably sharply defined, rather than diffuse or otherwise blurred. The optical density of background areas 20 at the read beam wavelength of gelatin layer 25 should be at least 0.5 and preferably greater than 1.0. The optical density of the spot areas 18 of gelatin layer 25 should be not more than 0.2 and preferably less than 0.1.

A method for making the optical storage media 14 data card in FIG. 1 comprises depositing metallic layer 24 on film substrate layer 22 by vacuum or vapor deposition and then applying the thin, planar photographic emulsion layer 25 over reflective metallic layer 24. The resulting media may then be prerecorded using the steps of exposure and surface development described in more detail below with reference to FIGS. 5A-5D and FIG. 6. Strip 14, seen in FIG. 1, containing prerecorded data is the result. This strip 14 is then applied to card base 12 by disposing film substrate layer 22 in intimate adhering planar contact over base 12. A planar, transparent protective layer 28 may finally be adhered over gelatin layer 25.

Alternatively, a card may be formed without film substrate layer 22 as seen in FIG. 3b. Metallic layer 24 may be deposited directly onto card base 12, and gelatin layers 25, containing the black crust 26, disposed over metallic layer 24, instead of first forming strip 14 from layers 22, 24, and 25. Also prerecording of data by exposure, development and fixing may be performed before of after disposing strip 14 or the individual layers 24 and 25 to base 12. It is preferred to complete processing of strip 14 first since it will be easier to handle when it is no longer photosensitive.

With reference to FIG. 4, a double sided embodiment of data card 10 comprises a first laser sensitive optical storage layer 30 with a thin dark crust 31 therein disposed over a self-supporting transparent planar plastic card base 12, a first vapor or vacuum deposited metallic layer 32 disposed adjacent film substrate layer 34, a second film substrate layer 36 disposed over first substrate layer 36, a second metallic layer 38 disposed over substrate layer 34, and a second laser sensitive optical storage layer 40 with a thin dark crust 35 therein disposed on metallic layer 38. The optical storage layers 30 and 40 comprise a thin black or dark surface area, as mentioned above, with a clear gelatin underlayer. A transparent protective layer 42 may be disposed over the optical storage layer 40.

First and second film substrate layers 34 and 36 are substantially similar to film substrate layer 22 in FIG. 3. Metallic layers 32 and 38 may be selected from the group consisting of gold, silver, aluminum, platinum, rhodium, and perhaps copper just as for metallic layer 24 in FIG. 3. Layers 32 and 38 may be identical or made of different metals. As with optical storage layer 26 in FIG. 3, each of the thin optical storage layers 30 and 40 in FIG. 4 was previously created by exposing photosensitive silver halide emulsion, preferably silver chloride, to actinic radiation, developing and fixing so that the emulsion is substantially dark at the emulsion surface, i.e. about 0.3 microns into the material. The developed emulsion layers 30 and 40 may have an imagewise exposure pattern of partially clear marks 44 and 18 respectively representing data bits with underlying high reflectivity in the adjacent metallic layers 32 and 38 respectively for light of reading wavelength. The previously developed emulsion layers 30 and 40 may be exposed and developed either at the same time or separately.

Formation of the optical storage media for the double sided data card in FIG. 4 may comprise depositing metallic layers 32 and 38 onto film substrate layers 34 and 36, respectively, by vacuum or vapor deposition. Then emulsion layers 30 and 40 are disposed on metallic layers 32 and 38, respectively. Emulsion layers 30 and 40 are then prerecorded as described in detail below with respect to FIGS. 5A-5D and FIG. 6. Each of the resulting strips of recording material is substantially similar. Layers 30, 32, and 34 form one strip, while layers 36, 38, and 40 form a second strip. These optical storage strips are the laser sensitive, but not photosensitive since all of the silver-halide emulsion was converted to silver or removed. The two strips are then adhered together, with an upper surface 46 of first support layer 34 in intimate planar contact with a low surface 48 of second support layer 36. One of the optical storage layers, in the present case first optical storage layer 30 is then disposed over transparent card base 12. A protective layer 42 may be disposed over the other optical storage layer, here layer 40. Alternatively, each of the layers may be sequentially disposed over card base 12. Exposure and development of one or more of the emulsion layers 38 and 40 may be performed after disposing onto card base 12 but this is more difficult since the emulsion is photosensitive.

With reference to FIGS. 5A-5D and FIG. 6, a photosensitive medium 50 containing an unexposed photosensitive emulsion layer 66 is disposed for exposure to actinic radiation. The emulsion layer is preferably a fine grain silver chloride emulsion in a gelatin matrix. Other silver halides, such as silver bromide, may be used, but must be developed in a modified developer solution disclosed below to prevent formation of filamentary silver. The smaller the grain sizes of the silver-halide emulsion, the higher the resolution of the final prerecorded product of this invention. The emulsion grain size should be less than 5% of the recording hole size for best results, and emulsions with grain size on the order of 0.05 microns are commercially available. Antihalation dyes, also known as attenuating or accutance dyes, may also be added to the photographic emulsion to increase the absorptivity of the emulsion at the actinic wavelength thereby concentrating the exposure to the top surface of the emulsion. This can help create a thin black recording crust. It can also reduce any halation effect and give higher resolutions. Such dyes are commonly used and are water soluble and thus are not present when the emulsion has been converted to the optical storage media.

If prerecording of track guides or data spots is desired, a shielding mask, such as mask 52, may be placed over unexposed medium 50. Mask 52 typically has two degrees of transmissivity to actinic radiation, being substantially clear over most of its extent, except for an imagewise pattern of optical dense marks 54, 56, 58, 60. As seen in FIG. 6, recording medium 50 is exposed with a light source 62 emitting light 64 at actinic wavelengths. Typically, the actinic light 64 has a wavelength in a blue-green range of 0.4 to 0.6 microns, although ultraviolet light with wavelengths less than 0.4 microns may also be used. Light 64 illuminating mask 52 is transmitted through clear areas 65 of mask 52 to emulsion layer 66, but is blocked by dark marks, such as spots 56, 58, and 60, of mask 52.

Exposure by the emulsion layer 66 to actinic radiation creates a latent image in which silver halide is activated substantially to saturation under clear areas 65 of mask 52 and remain substantially unactivated under dark marks 54, 56, 58 and 60. This latent image is shown in FIG. 5C in which the exposed photosensitive medium 70 contains an emulsion of activated silver halide over substantial regions 72 and unactivated silver halide in spot regions 74, 76, 78 and 80.

Exposed medium 70 is surface developed to produce a medium 82 which is substantially dark over most of its extent, but having an imagewise exposure pattern of partially clear marks 84, 86, 88 and 90 with underlying reflectivity in the metallic layer 68 for light of reading beam wavelength. Development of the surface layer is surface development occuring typically within the top 0.3 to 0.5 micron of the emulsion layer in a plane distal from the substrate. Such development occurs by contacting the light exposed image layer with a concentrated development solution for a very short period, before the development solution can diffuse into the material or by means of a slow-diffusing developer such as tertiary butylhydroquinone.

Alternatively, a viscous developer thickened with carboxymethylcellulose may be used. This material is syrupy in consistency and is rolled on. It may be washed off and development stopped with a spray stop bath. It then is treated with a fixing bath. Crusts as thin as five to ten percent of the thickness of a ten to fifteen micron emulsion layer have been made. During development, areas containing black irregular or oblong silver particles are formed from activated silver-halide areas. The volume concentration of activated silver halide at the emulsion surface determines the volume concentration of oblong silver particles, which in turn determines the optical density of the emulsion layer. Accordingly, spots 84, 86, 88, and 90 contain few if any, silver particles since these spot areas were mostly spots 74, 76, 78 and 80 of unexposed and unactivated silver halide which were under dark spots 54, 56, 58 and 60 of mask 52. Areas containing oblong silver particles should exhibit an optical density as measured with red light of a photographic densitometer of at least 0.5 and preferably greater than 1.0, while the unexposed areas should have densities less than 0.2. Subsequent to development, fixing and rinse steps remove the remaining silver halide from emulsion layer 66.

Exposed silver chloride emulsions, when developed, produce irregularly shaped spheroidal silver particles which are highly absorptive, i.e. black, and which respond to a laser recording beam by modification into bright smooth spherical particles. However, exposed silver bromide emulsions tend to produce filamentary silver particles when developed. Filamentary silver, while black, does not respond to the recording laser beam in the same way as irregular spheroid silver particles, and when filamentary silver is present in the thin crust, laser recording performance is greatly degraded. In order to produce irregular spheroidal silver particles from a silver bromide emulsion, organic stabilizers or antifoggants are included in the developing solution. These compounds include, for example, organic thiols, such as 1-phenyl-1H-tetrazole-5-thiol, 1-phenyl-2-imidazolidine-thione, and 4,4,5-trimethyl-4H-pyrazole-3thiol. Previously, these compounds have been used to control growth of reflective silver spheres in diffusion transfer photography. In the present instance, the compounds attach themselves to the unreacted silver bromide andinhibit the action of the chemical developing agent. In doing so, the shape of the resulting silver grains is that of irregular spheroids which form a crust with substantial covering power, i.e. low transmissivity. As already noted, silver chloride emulsions do not require the use of organic antifoggants to produce irregular spheroid silver grains.

When an antihalation dye is not used, effects of halation in emulsion layer 66 during exposure to actinic radiation are minimized when the emulsion layer 66 is very thin, i.e. less than 5 microns, and when metallic layer 68 beneath emulsion layer 66 is substantially less reflective at the wavelengths of the actinic radiation. In FIG. 7, the reflectivities of gold, copper, silver and aluminum at different wavelengths are seen. At the read beam wavelength in the near infrared, i.e. a wavelength longer than 0.8 microns, all of the metals have a reflectance of at least 80 percent and all but aluminum have a reflectance greater than 90 percent. Thus, each metal has a high reflectivity to produce a high optical contrast of reflective data spots against a dark background for reading.

Gold and copper are substantially less reflective at a wavelength of actinic light in the range from 0.4 to 0.6 microns, i.e. for blue and green light. For example, gold has a reflectance of approximately 35 to 40 percent for wavelengths less than 0.5 microns. Copper has a reflectance of less than 60 percent for wavelengths shorter than 0.6 microns. These reduced reflectances reduce the halation effects.

Silver and aluminum both have reflectances of greater than 80 percent for wavelengths between 0.4 and 0.6 microns. Accordingly, silver and aluminum are less suitable for media to be exposed to actinic radiation in this wavelength range. In fact, aluminum has greater reflectance for wavelengths in the 0.4 to 0.6 micron range than for wavelengths in the near infrared range from 0.8 to 1.0 microns. To compensate for this, aluminum metallic layers may be used with thinner photosensitive emulsion layers to minimize the halation effect and can still be suitable for emulsions two to three microns thick. Also, antihalation dyes may be used.

The present invention utilizes a very thin black silver crust within one of the planar surfaces of a gelatin layer and a reflective under layer to achieve good recording sensitivity, high contrast and resolution laser recording and pre-recording of tracks and data and also permits laser recording of track, and other formatting data. The card can also be used as a read only memory card with prerecorded tracks and data and without user recording of data.

A laser apparatus is illustrated in FIG. 8, which illustrates the side view of the lengthwise dimension of the card of FIG. 1. The data medium 41 of the card is usually received in a movable holder 39 which brings the strip into the trajectory of a laser beam. A laser light source 43, preferably a pulsed semiconductor laser of near infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing and is not essential. The beam is then directed to a first servo controlled mirror 55 which is mounted for rotation along axis 57 in the direction indicated by arrows B. The purpose of the mirror 55 is to find the lateral edges of the recording medium in a coarse mode of operation and then in a fine mode of operation identify data paths which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 39. The position of the holder may be established by a linear motor adjusted by a closed loop position servo system of the type used in magnetic disk drives. Reference position information may be pre-recorded on the card so that position error signals may be generated and used as feedback in motor control. After reading one data path, the mirror 55 is slightly rotated or turned. The motor moves holder 39 lengthwise so that the path can be read again, and so on. As light is scattered and reflected from data spots in the dark crust of the optical storage layer, the reflectivity of the beam changes relative to surrounding material where no data spots exist. The beam should deliver sufficient laser energy to the dark crust of the optical storage layer to create data spots in the data writing mode, but should not cause disruption of the surfaces by the energy in the read beam so as to cause difficulty in the data reading mode. The size of a laser recorded data spot is about the same as a prerecorded data spot, preferably less than 10 microns. The wavelength of the laser should be compatible with the recording material to achieve this purpose. In the read mode, power is approximately 10 percent of the recording or writing power.

Differences in reflectivity between a laser data spot or prerecorded spot and surrounding material are detected by light detector 65 which may be a photodiode. Light is focused onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to laser data spots or prerecorded spots.

A photodetector array such as a CCD could also be used. It could be either a linear array or area array. The number of detector elements per data spot would be approximately three elements to create a reading redundancy. The surface would be illuminated with low-cost light emitting diodes generating power primarily in the near infra-red to match the sensitivity spectrum of the photodetector array.

An alternate manufacturing method for a card in accord with the present invention involves depositing a reflective vacuum or vapor metallic layer of the kind previously described over a planar card base. After this step, the photosensitive emulsion layer is coated uniformly over the metallic layer to the previously specified thickness. The emulsion layer is then patterned, developed and fixed to the extent that there is a planar crust of black irregular silver particles forming a substantially dark thin layer, as previously described, with substantially clear gelatin beneath. In general, it is preferable to pattern the emulsion on the film substrate and then adhere it to the card, but the method described above may be used as an alternative.

We claim:

1. An optical memory card for optical information comprising,
   a self-supporting, wallet size, planar plastic base,
   a vacuum or vapor deposited continuous metallic reflective layer over said plastic base,
   a planar optical storage layer disposed over the metallic layer, said optical storage layer having a planar crust of irregular, non-filamentary oblong black silver particles substantially within the top one-half micron of the layer distal to the metallic layer, said optical storage layer having a substantially clear gelatin below the crust.

2. The optical memory card of claim 1 further comprising a film substrate layer disposed over said base in intimate contact therewith in planar relation, said metallic layer deposited on said film substrate layer.

3. The optical memory card of claim 1 wherein said metallic layer is selected from the group consisting of gold, silver, aluminum, platinum, rhodium, copper and alloys thereof.

4. The optical memory card of claim 1 wherein a transparent, protective, planar layer is disposed over said optical storage layer.

5. The optical memory card of claim 1 wherein said optical storage layer contains prerecorded information.

6. The optical memory card of claim 1 wherein said optical storage layer contains prerecorded information and laser written data.

7. A double-sided optical memory card for optical information comprising,
   a self-supporting, wallet-size, optically transparent planar plastic base,
   a first planar optical storage layer disposed over said plastic base, said optical storage layer having a crust of irregular, non-filamentary oblong black silver particles substantially within one-half micron of the layer proximal to the base and having a substantially clear gelatin below the crust,
   a first vapor or vacuum deposited metallic continuous reflective layer disposed on said gelatin layer, a first planar support layer disposed over said molecular metallic layer, said support layer having opposed planar surfaces, including a lower surface proximate said plastic base and an upper surface distal to said plastic base, a second planar support layer, substantially identical to said first support layer and adhered to the upper surface thereof, a second vapor or vacuum deposited metallic continuous reflective layer disposed over said second planar transparent support layer, a second planar optical storage layer disposed over the upper surface of said second planar transparent support layer, said optical layer having a planar crust of irregular, non-filamentary oblong black silver particles substantially within the top one-half micron of the layer distal to the base and having a substantially clear gelatin below the crust, and a transparent, protective, planar layer disposed over said second storage layer, each of said optical storage layers having been previously exposed at actinic wavelength and developed and fixed to be a substantially dark very thin black silver layer, but having an imagewise exposure pattern of clear marks with underlying high reflectivity metallic layer for light at the reducing wavelength.

8. The optical memory card of claim 7 wherein said metallic layer material is selected from the group consisting of gold, silver, aluminum, platinum, rhodium, copper and alloys thereof.

9. The data card of claim 7 wherein said optical storage layers contain prerecorded information.

10. The data card of claim 7 wherein said optical storage layers contain prerecorded information and laser written data.

11. A method for making an optical information memory card comprising, depositing a continuous vacuum or vapor metallic layer over a self-supporting, planar plastic base, disposing a planar photosensitive emulsion layer over said metallic layer, developing and fixing only a planar crust of said emulsion to a substantially dark thin layer of irregular, non-filamentary silver particles with a substantially clear gelatin layer beneath said crust, and disposing a transparent, planar protective layer over said planar crust.

12. The method of claim 11 further defined by making an imagewise exposure of marks representing control indicia or data, said exposure made in said photosensitive emulsion layer with radiation, and developing and fixing said exposure pattern of image marks being substantially clear revealing an underlying reflectivity in the metallic layer when illuminated by light.

13. The method of claim 11 wherein said photosensitive emulsion layer is composed of a silver chloride emulsion.

14. The method of claim 11 wherein said photosensitive emulsion layer is composed of a silver bromide emulsion and developing said emulsion is performed with a chemical developer containing an organic antifoggant.

15. A method of making an optical information memory card comprising, depositing a continuous vacuum or vapor metallic layer onto a transparent film substrate layer, disposing a planar photosensitive emulsion layer over said metallic layer, developing and fixing only a planar crust of said emulsion to be a substantially dark thin layer of irregular, non-filamentary silver particles with a substantially clear gelatin layer beneath said crust, said film substrate layer, said metallic layer and said developed and fixed emulsion layer forming a laser recordable optical storage film, disposing said developed optical storage film over a self-supporting, wallet-size, planar plastic base, and disposing a transparent, planar protective layer over said planar crust.

16. The method of claim 15 further comprising, making an imagewise exposure of marks representing control indicia or data, said exposure made in said photosensitive emulsion layer with radiation, and developing and fixing said exposure pattern of image marks being substantially clear revealing an underlying reflectivity in the metallic layer when illuminated by light, said developing and fixing occurring prior to disposing said developed optical storage film over said plastic base.

17. A system for recording data by means of a laser comprising, an optical memory card having a self-supporting, wallet-size planar base, and at least one optical storage layer disposed on said base, each said optical storage layer having a planar crust of irregular nonfilamentary oblong black silver particles substantially within one-half micron of a surface of said storage layer and substantially clear gelatin behind the crust, a continuous reflective metallic layer being disposed behind the gelatin, the optical storage layer being laser recordable in place on said card producing reflective data spots revealing an underlying reflectivity of the metallic layer against a background field of said crust, the optical reflective contrast ratio of the data spots to the surrounding field being at least 1.2 to one, laser means having at least one beam disposed in laser writing relation with respect to said at least one optical storage layer for writing data in a plurality of paths, light detector means in reading relation with respect to at least one said optical storage layer for reading said paths, and means for providing relative motion between said laser beam and said card for following said paths.

* * * * *